(12) United States Patent
Hu et al.

(10) Patent No.: US 11,172,603 B2
(45) Date of Patent: Nov. 16, 2021

(54) EJECTING-CLAMPING-PULLING COMBINED SEEDLING FETCHING DEVICE FOR AUTOMATIC TRANSPLANTER AND OPERATING METHOD THEREFOR

(71) Applicant: JIANGSU UNIVERSITY, Jiangsu (CN)

(72) Inventors: Jianping Hu, Jiangsu (CN); Zhaoxia Luo, Jiangsu (CN); Haoran Pan, Jiangsu (CN); Yijun Liu, Jiangsu (CN); Siwei Zhang, Jiangsu (CN); Chen Hua, Jiangsu (CN)

(73) Assignee: JIANGSU UNIVERSITY, Jiangsu (CN)

( * ) Notice: Subject to any disclaimer, the term of this patent is extended or adjusted under 35 U.S.C. 154(b) by 332 days.

(21) Appl. No.: 16/477,800

(22) PCT Filed: Apr. 28, 2018

(86) PCT No.: PCT/CN2018/084969
§ 371 (c)(1),
(2) Date: Jul. 12, 2019

(87) PCT Pub. No.: WO2019/047541
PCT Pub. Date: Mar. 14, 2019

(65) Prior Publication Data
US 2020/0120860 A1   Apr. 23, 2020

(30) Foreign Application Priority Data
Sep. 6, 2017   (CN) .......................... 201710797559.5

(51) Int. Cl.
*A01C 11/02* (2006.01)
(52) U.S. Cl.
CPC ................................. *A01C 11/025* (2013.01)

(58) Field of Classification Search
CPC ....... A01C 11/00; A01C 11/006; A01C 11/02; A01C 11/025; A01C 11/04
See application file for complete search history.

(56) References Cited

U.S. PATENT DOCUMENTS

| 5,676,072 A  * | 10/1997 | Williames | ............ A01C 11/025 |
| | | | 111/105 |
| 6,634,306 B1 * | 10/2003 | Faulring | .............. A01C 11/025 |
| | | | 111/105 |

(Continued)

FOREIGN PATENT DOCUMENTS

| CN | 101940102 A | 1/2011 |
| CN | 102301856 A | 1/2012 |

(Continued)

*Primary Examiner* — Jamie L McGowan
(74) *Attorney, Agent, or Firm* — Saliwanchik, Lloyd & Eisenschenk

(57) ABSTRACT

An ejecting-clamping-pulling combined seedling fetching device for an automatic transplanter and an operating method therefor. The device comprises: a seedling ejecting mechanism (1), a seedling feeder mechanism (2), a seedling fetching mechanism (3), and a control system. The seedling feeder mechanism (2) is mounted on a stander; the seedling ejecting mechanism (1) is mounted on the seedling feeder mechanism (2) and is located at the rear side of the seedling feeder mechanism (2); the seeding fetching mechanism (3) is mounted at the stander and is located at the front side of the seedling feeder mechanism (2). An upper ejector rod support (1-6) and a lower ejector rod support (1-4) are provided on the seedling ejecting mechanism (1); the seedling ejecting rods on the two supports are disposed in a staggered manner, and the upper ejector rod support (1-6) and the lower ejector rod support (1-4) are configured to alternately eject and loosen seedling trays. The ejecting-clamping-pulling combined seedling fetching device can eject and loose seedling trays, and the completeness of the (Continued)

trays is guaranteed. The ejecting-clamping-pulling seedling fetching method can accurately control seedling fetching and feeding actions; and furthermore, the device is simple in structure, high in reliability and efficiency and low in damage rate of tray bodies.

8 Claims, 5 Drawing Sheets

(56) References Cited

U.S. PATENT DOCUMENTS

| | | | | |
|---|---|---|---|---|
| 7,036,440 | B1* | 5/2006 | Sena | A01C 11/025 |
| | | | | 111/105 |
| 7,051,475 | B1* | 5/2006 | Sena | A01C 11/025 |
| | | | | 111/105 |
| 2002/0043195 | A1* | 4/2002 | Williames | A01C 11/025 |
| | | | | 111/105 |
| 2006/0130720 | A1* | 6/2006 | Parrein | A01C 11/025 |
| | | | | 111/105 |
| 2012/0174839 | A1* | 7/2012 | Faulring | A01G 9/0299 |
| | | | | 111/100 |
| 2015/0342112 | A1* | 12/2015 | Buell | A01C 11/02 |
| | | | | 111/105 |
| 2020/0120860 | A1* | 4/2020 | Hu | A01C 11/025 |
| 2020/0260636 | A1* | 8/2020 | Ito | A01C 11/025 |
| 2020/0375089 | A1* | 12/2020 | Crouse | A01C 11/025 |

FOREIGN PATENT DOCUMENTS

| | | |
|---|---|---|
| CN | 203633111 U | 6/2014 |
| CN | 104509253 A | 4/2015 |
| CN | 104782292 A | 7/2015 |
| CN | 104782295 A | 7/2015 |
| CN | 204634345 U | 9/2015 |
| CN | 107466561 A | 12/2017 |
| JP | 2009261330 A | 11/2009 |
| KR | 20020034802 A | 5/2002 |

* cited by examiner

US 11,172,603 B2

EJECTING-CLAMPING-PULLING COMBINED SEEDLING FETCHING DEVICE FOR AUTOMATIC TRANSPLANTER AND OPERATING METHOD THEREFOR

CROSS REFERENCE TO RELATED APPLICATIONS

This application is a National Stage Application of International Application Number PCT/CN2018/084969, filed Apr. 28, 2018; which claims priority to Chinese Application No. 201710797559.5, filed Sep. 6, 2017.

FIELD OF THE INVENTION

The invention relates to the field of agricultural machinery, particularly to a ejecting-clamping-pulling combined picking seedling device for automatic transplanter and working method thereof.

BACKGROUND OF THE INVENTION

Transplanting is the main way of vegetable cultivation. Transplanting can avoid natural disasters such as drought and freezing during seedling growing period, and make full use of light and heat resources. It can compensate for climate, make crops mature earlier and increase yield, and has great economic and social benefits.

At present, there are semi-automatic and full-automatic transplanters on the market. Semi-automatic transplanters plant seedlings through planters, but they need to take seedlings from the hole tray artificially and drop seedlings. This kind of transplanter has high labor intensity and low efficiency. The seedling picking and seedling planting of the automatic transplanter are all accomplished automatically by machinery. The seedling picking mechanism is the core part of the automatic transplanter. Ejecting seedlings can reduce the breakage rate of the seedling bowl. The ejecting seedlings mechanism has become the key element of the automatic seedling picking. In the prior art, Chinese Patent Publication No. CN 101940102A discloses a row of ejecting seedling mechanism of bowl seedling transplanter, which can automatically eject seedling bowls in rows efficiently and quickly, thus paves the way for automatic seedling collection. But this ejecting seedling mechanism is actually a crank-slider mechanism. The cylinder drives the crank to rotate and drives the ejecting rod on the slider to push out seedlings. The mechanical structure is complex and the cost is high. Chinese Patent Publication No. CN 203633111U discloses an ejecting seedling mechanism and a seedling transplanter with the same. The spacing of the unit of the ejecting seedling rod can be adjusted adaptively, but the mechanical structure is complex. The deviation direction of the ejecting rod is uncertain and may deviate from the hole of the seedling.

CONTENT OF THE INVENTION

In view of the shortcomings in the prior art, the present invention provides a ejecting-clamping-pulling combined picking seedling device for automatic transplanter and working method thereof. The ejecting-clamping-pulling combined picking device can make the ejected seedlings loose and ensure the integrity of the bowl body. This method not only can accurately control the action of seedling picking and dropping, but also has simple structure, high reliability and efficiency, and low broken rate of bowl body.

The invention realizes the above technical purposes by the following technical means.

A ejecting-clamping-pulling combined picking seedling device for automatic transplanter, comprises an ejecting seedling mechanism, a moving-box mechanism, a picking seedling mechanism and a control system. The moving-box mechanism is mounted on the machine frame, the hole tray is mounted on the moving-box mechanism, the ejecting seedling mechanism is mounted on the moving-box mechanism and is located at the rear side of the moving-box mechanism, the picking seedling mechanism is mounted on the machine frame and located on the front side of the moving-box mechanism.

The ejecting seedling mechanism includes an ejecting seedling machine frame, an upper ejecting seedling cylinder, an upper ejecting rod support, an ejecting rod, a lower ejecting seedling cylinder and a lower ejecting rod support. A first guide shaft is arranged above and below the left and right sides of the ejecting seedling machine frame, the upper ejecting seedling cylinder is fixedly mounted on the top center of the ejecting seedling machine frame. the lower ejecting seedling cylinder is fixedly mounted at the bottom center of the ejecting seedling machine frame. The upper ejecting rod support is long rod, one side of the upper ejecting rod support is provided with a plurality of protrusions at equal intervals along the length direction. The center distance between two protrusions is twice the distance between two adjacent holes on the hole tray. The ejecting seedling rod passes through the protrusions and is fixed on the protrusions. The lower ejecting rod support and the upper ejecting rod support both have the same shape. The two ends of the upper ejecting rod support are slidingly connected with the first guide shaft at the upper ends of left and right sides of the ejecting seedling machine frame through a first linear bearing. The two ends of the lower ejecting rod support are slidingly connected with the first guide shaft at the lower ends of left and right sides of the ejecting seedling machine frame through a first linear bearing. A cylinder piston of the upper ejecting seedling cylinder is fixedly connected with the upper ejecting rod support, a cylinder piston of the lower ejecting seedling cylinder is fixedly connected with the lower ejecting rod support.

The protrusions on the lower ejecting rod support and the protrusions on the upper ejecting rod support are staggered arranged at equal intervals and are located on the transverse central line of the ejecting seedling machine frame.

The control system is electrically connected with the ejecting seedling mechanism, the moving box mechanism and the picking seedling mechanism. The control system controls the moving box mechanism to convey the hole tray to the seedling picking position. The control system controls the work of the upper ejecting seedling cylinder and the lower ejecting seedling cylinder of the ejecting seedling mechanism, and drives the upper and lower ejecting rod support to move upward respectively, thereby the ejecting rod passes through the hole in the hole tray and eject the seedling bowl on the moving box mechanism loosely. The control system controls the picking seedling mechanism to pick seedlings from the moving box mechanism.

Preferably, the ejecting seedling mechanism also comprises an upper cylinder connecting plate and a lower cylinder connecting plate. The top of the upper cylinder connecting plate is connected with the piston rod of the upper ejecting seedling cylinder. The bottom end of the upper cylinder connecting plate is fixedly connected with the upper ejecting rod support. The top of the lower cylinder connecting plate is fixedly connected with the lower ejecting rod support, and the bottom end of the lower cylinder connecting plate is connected with the piston rod of the lower ejecting seedling cylinder.

Preferably, it characterized in that the ejecting seedling machine frame comprises an upper mounting plate, a lower mounting plate, a right ejecting seedling support, a left ejecting seedling support and a guide shaft support. The two ends of the upper and lower mounting plates are respectively fixed on the right ejecting seedling support and the left ejecting seedling support to form a frame structure. Both of the right ejecting seedling support and the left ejecting seedling support are provided with four guide shaft supports. The front and rear ends of the first guide shaft are mounted on the the guide shaft supports.

Preferably, the moving box mechanism includes a stepping motor, a moving box machine frame, a transverse tray-moving cylinder, second guiding shaft, hole-tray conveying device, press rod and press rod cylinder.

The moving box frame is provided with left and right side plates, and the second guiding shafts are transversely arranged, and the number of the second guiding shafts is at least two. Each second guiding shaft passes through the hole tray conveying device, and the two ends of each second guiding shaft are respectively fixed on the left side plate and the right side plate. The hole tray conveying device is slidingly connected with the second guiding shaft. A hole tray frame and a hole tray frame driving mechanism are arranged on the hole tray conveying device. The hole tray is installed on the hole tray conveying frame.

The motor shaft of the stepping motor is connected with the hole tray frame driving mechanism to control the longitudinal movement of the hole tray frame. The piston rod of the transverse tray-moving cylinder is connected with the hole tray conveying device to control the transverse movement of the hole tray conveying device. The press rod is mounted on the upper side of the hole tray conveying device. The cylinder piston rod of the press rod cylinder is connected with the press rod, one end of the press rod cylinder is installed on the machine frame, and the other end of the press rod cylinder is connected with the press rod. The control system is electrically connected with the press rod cylinder to control the telescopic movement of the cylinder piston rod of this press rod cylinder, thereby to drive the press rod up and down, the pressure rod is pressed down to waiting for the seedlings to be taken, and after the seedling is taken, the press rod rises.

Preferably, the present invention also have a hole tray position sensor, which is mounted at picking seedlings position. This hole tray position sensor is electrically connected with the control system to locate the initial tray position of the hole tray. If the hole tray reaches the initial seedling picking position, triggering the action of seedling picking.

Preferably, the press rod includes a press rod shaft, a plurality of locating ring sleeves and a plurality of bent rods. The locating ring sleeves are installed on the press rod shaft with equal spacing, and their the relative position is adjustable. Each locating ring sleeve is provided with a guide hole. One end of the bent rod is inserted into a guide hole and welded connected with the locating ring sleeve. The press rod shaft is fixedly mounted on the fixing plate of the press rod shaft through two press rod bearing pedestals.

One end of the press rod cylinder is installed on the fixing plate of the press rod shaft, the other end of the press rod cylinder is connected with one end of the press rod shaft through oscillating bar and the lower end of the fixing plate of the press rod shaft is removably mounted on the machine frame.

Preferably, the seedling picking mechanism includes a rotary shaft, a plug-and-pull cylinder, a turning cylinder, a plurality of seedling picking claws, a guiding optical axis, a seedling picking frame, a limit nut and a seedling picking claw frame.

One end of the turning cylinder is articulated with the right side plate of the box moving machine frame, and the piston rod on the other end of the turning cylinder is articulated with the seedling picking frame. The rotating shaft can rotatably pass through the seedling picking frame, and the two ends of the rotating shaft can be rotatably installed on the left and right side plates of the moving box machine frame respectively. The right side plate is provided with a limit block, and a limit nut is arranged on the limit block, the seedling picking frame stop when turned over at the position of the limit block.

A guide optical axis is arranged on both sides of the inner surface of the seedling picking frame. The plurality of seedling picking claws are arranged side by side on the seedling claw frame, and the spacing between the seedling picking claws is the same as that between the ejecting rod of the upper ejecting rod support. The cylinder piston of the plug-and-pull cylinder is fixedly connected with the seedling picking claw frame, and the two sides of the seedling picking claw frame are slidingly connected with the guiding optical axis. The control system is electrically connected with the plug-and-pull cylinder and the turning cylinder. By controlling the expansion and contraction of the cylinder piston of the plug-and-pull cylinder, the seedling picking claw frame slides along the guiding optical axis, and the turning of the seedling picking frame is controlled by controlling the turning cylinder.

A working method of the ejecting-clamping-pulling combined picking seedling device for automatic transplanter, includes the following steps:

S1: The hole tray is mounted on the hole tray frame of the hole tray conveying device. The control system controls the step motor to drive the bottom row of the hole tray on the hole tray frame to the seedling picking position, and the hole tray position sensor sends the signal to the control system.

S2: The seedling picking mechanism is in a vertical state. The control system receives the signal from the hole tray position sensor and controls the movement of the press rod cylinder, the press rod is pressed down. The piston rod of the turning cylinder extends and drives the seedling picking frame to rotate around the rotary shaft. When the seedling picking frame contacts the limit nut, the seedling picking frame stops rotating, and the seedling picking claws are above the seedling bowl.

S3: The control system controls the piston rod of the upper ejecting seedling cylinder of the ejecting seedling mechanism to extend, and the upper ejecting rod support moves along the first guiding shaft. The ejecting rod on the upper ejecting rod support loosens the seedling bowl in the hole tray on the hole tray frame at interval. After the seedling bowl is loosened, the upper ejecting seedling cylinder is reset.

S4: The control system controls the cylinder piston of the plug-and-pull cylinder to extend and drive the seedling picking claw to insert into the seedling bowl, and the seedling picking claw clamps the seedling bowl at the same time. Then the cylinder piston of the plug-and-pull cylinder contracts and drives the seedling picking claws to pull out the seedling bowl, the turning cylinder resets, and turns the seedling picking frame to the vertical position. The control system controls the seedling picking claws to loosen the seedling bowl and drop the seedling into the seedling cups.

S5: The transverse tray-moving cylinder drives the hole tray conveying device to transversely move the distance between two adjacent holes of the hole tray, repeating step 2.

S6: The control system controls the piston rod of the lower ejecting seedling cylinder to extend, and the lower ejecting rod support moves along the first guiding shaft. The ejecting rod on the lower ejecting rod support loosens the seedling bowl in the hole tray on the hole tray rack at interval. After the seedling bowlis loosened, the lower ejecting seedling cylinder resets and a whole row of seedling bowls are taken out, which forms a seedling collection cycle.

S7: The controller controls the stepping motor to drive the hole tray rack to continue to deliver a row of hole trays to the seedling picking position and start the next seedling picking cycle until the whole tray seedling bowl is taken.

The beneficial effects of the present invention are as follows:

The ejecting seedling mechanism of the invention can eject the seedling bowl to loosen it at interval, reduce the broken rate of the seedling bowl, reduce the damage to the root and stem of the seedling bowl, and improve the survival rate of the seedling bowl.

The invention can meet the requirements of seedling picking of various specifications of the hole trays, has strong applicability, and is easy to realize and install on the platform of transplanter.

The invention has simple structure, reliable movement and is easy to popularize and use.

The ejecting seedling mechanism; 1-1. Right ejecting seedling support; 1-2. The upper mounting plate; 1-3. The upper ejecting seedling cylinder; 1-4. The upper ejecting seedling cylinder support; 1-5. The upper cylinder connecting plate; 1-6. The upper ejecting rod support; 1-7. Guiding shaft support; 1-8. Left ejecting seedling support; 1-9. The ejecting rod; 1-10. The ejecting rod adjusting nut; 1-11. The lower ejecting seedling cylinder; 1-12. The lower ejecting seedling cylinder support; 1-13. The lower cylinder connecting plate; 1-14. The lower ejecting rod support; 1-15. The lower mounting plate; 1-16. Guiding shaft; 1-17. First linear bearing; 2. The moving box mechanism; 2-1. The stepping motor; 2-2. The moving box frame; 2-3. The transverse tray moving cylinder; 2-4. Guiding shaft; 2-5. hole tray conveying device; 2-6. Press rod; 2-6-1. The press rod shaft; 2-6-2. Locating ring sleeve; 2-6-3. Bent rod; 2-7. The press rod cylinder; 2-8. oscillating bar; 2-9. The press rod bearing block; 3. The picking seedling mechanism; 3-1. The rotating shaft; 3-2. Plug-and-pull cylinder; 3-3. The turning cylinder; 3-4. The seedling picking claw; 3-5. Guiding optical axis; 3-6. Seedling picking frame; 3-7. Limit nut; 3-8. Seedling picking claw frame; 4. hole tray.

DETAILED DESCRIPTION OF THE EMBODIMENT

The present invention is further described in connection with the drawings and embodiments, but the protection scope of the present invention is not limited thereto.

Figure 1:
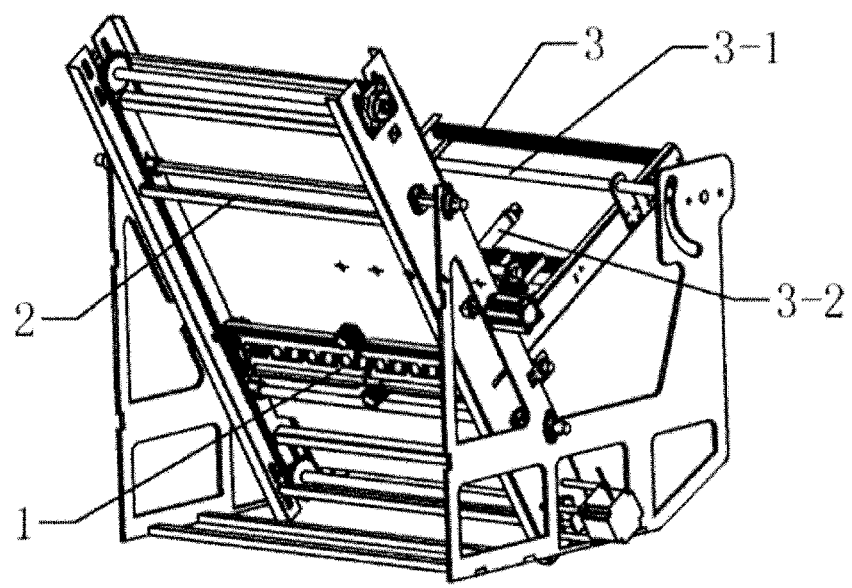
FIG. 1 is a structural diagram of the ejecting-clamping-pulling combined picking seedling device according to the present invention.
Figure 2:
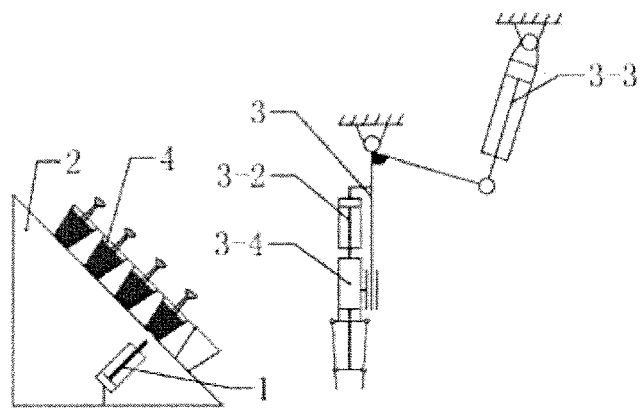
FIG. 2 is a motion sketch of the ejecting-clamping-pulling combined picking seedling device according to the present invention.

As shown in FIG. 1, an ejecting-clamping-pulling combined picking seedling device for automatic transplanter comprises an ejecting seedling mechanism 1, a moving-box mechanism 2, a picking seedling mechanism 3 and a control system. The moving-box mechanism 2 is mounted on the machine frame, the hole tray 4 is mounted on the moving-box mechanism 2, the ejecting seedling mechanism 1 is mounted on the moving-box mechanism 2 and is located at the rear side of the moving-box mechanism 2, the picking seedling mechanism 3 is mounted on the machine frame and located on the front side of the moving-box mechanism 2.

Figure 3:
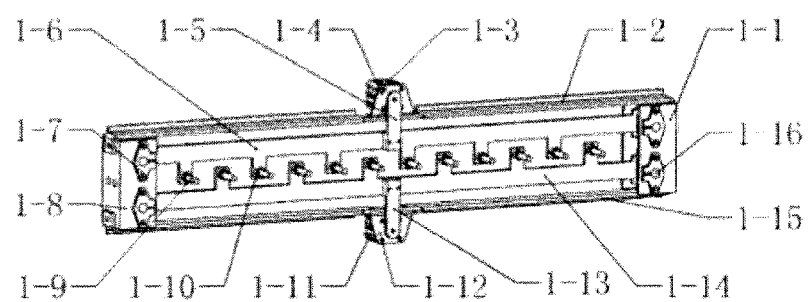
FIG. 3 is a structural diagram of the ejecting seedling mechanism of the present invention.
Figure 4:
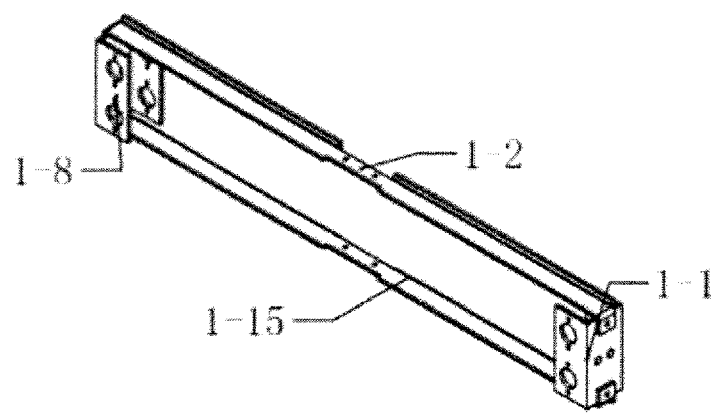
FIG. 4 is a structural diagram of the ejecting seedling mechanism machine frame of the present invention.
Figure 5:
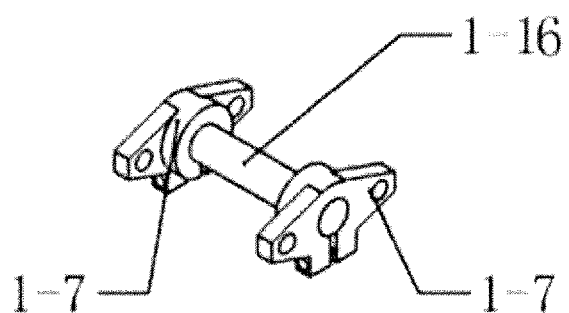
FIG. 5 is a schematic diagram for the installation of the first guide shaft and the guide shaft support of the present invention.
Figure 6:
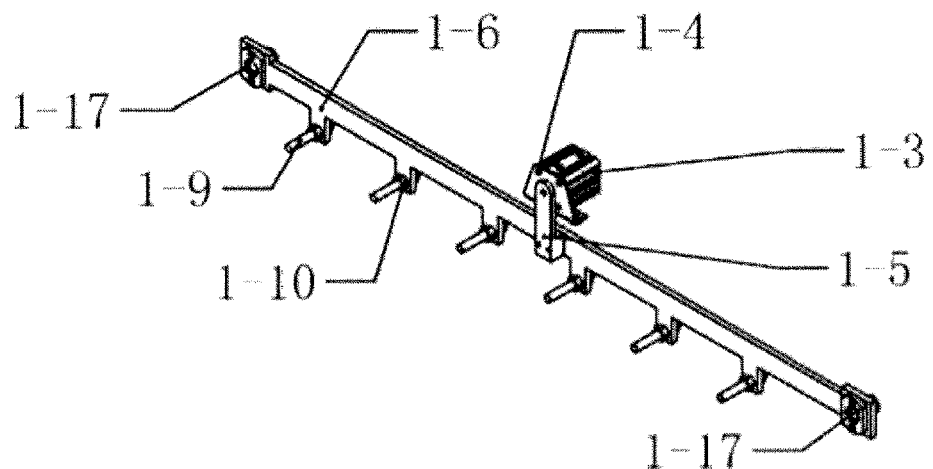
FIG. 6 is a schematic diagram of the structure of the upper ejecting rod support according to the present invention.
Figure 7:
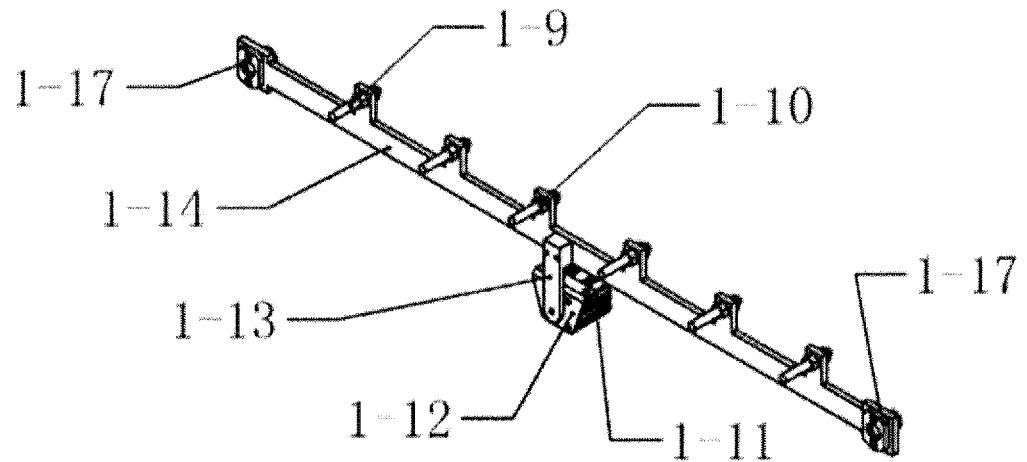
FIG. 7 is a schematic diagram of the structure of the lower ejecting rod support according to the present invention.

As shown in FIGS. 3-5, the ejecting seedling mechanism 1 includes an ejecting seedling frame, an upper ejecting seedling cylinder 1-3, an upper cylinder connecting plate 1-5, an upper ejecting rod support 1-6, an ejecting rod 1-9, a lower ejecting seedling cylinder (1-11), a lower cylinder connecting plate 1-13 and a lower ejecting rod support 1-14. The ejecting seedling frame includes an upper mounting plate 1-2, a lower mounting plate 1-15 right ejecting seedling support 1-1, left ejecting seedling support 1-8 and a guiding shaft support 1-7, the two ends of the upper mounting plate 1-2 and the lower mounting plate 1-15 are respectively fixed to the right ejecting seedling support 1-1 and the left ejecting seedling support 1-8 to form a frame structure. both of the right ejecting seedling support 1-1 and the left ejecting seedling support 1-8 are provided with four guide shaft supports 1-7. There are two first guide shaft 1-16 at up and down on the left and right sides of the ejecting seedling frame. The front and back ends of each first guide shaft 1-16 are installed on the guide shaft support 1-7. The upper ejecting seedling cylinder 1-3 is fixedly mounted at the top center of the ejecting seedling frame through the upper ejecting seedling cylinder support 1-4. The lower ejecting seedling cylinder 1-11 is fixedly mounted at the bottom center of the ejecting seedling frame through the lower ejecting seedling cylinder support 1-12. As shown in FIG. 6, the upper ejecting rod support 1-6 is long rod-shaped, and one side of the upper ejecting rod support 1-6 is equipped with a plurality of protrusions with equal spacing along the length direction. The center distance between two protrusions is twice the distance between two adjacent holes on the hole tray of the moving box mechanism 2. The ejecting rod 1-9 passes through the protrusion and is fixed on the protrusion. As shown in FIG. 7, the shape of the lower ejecting rod support 1-14 is the same as that of the upper ejecting rod support 1-6. The two ends of the upper ejecting rod support 1-6 are slidingly connected with the first guide shaft 1-16 at the upper left and right sides of the ejecting seedling frame through the first linear bearing 1-17. The two ends of the lower ejecting rod support 1-14 are slidingly connected with the first guide shaft 1-16 at the lower left and right sides of the ejecting seedling frame through the first linear bearing 1-17. The top end of the upper cylinder connecting plate 1-5 is connected with the piston rod of the upper ejecting seedling cylinder 1-3, The bottom end of the upper cylinder connecting plate 1-5 is fixedly connected with the upper ejecting rod support 1-6, The top end of the lower cylinder connecting plate 1-13 is fixedly connected with the lower ejecting rod support 1-14, and the bottom end of the lower cylinder connecting plate 1-11 is connected with the piston rod of the lower ejecting seedling cylinder.

The moving box mechanism 2 comprises a stepping motor 2-1, a moving box frame 2-2, a transverse tray moving cylinder 2-3, a second guiding shaft 2-4, a hole tray conveying device 2-5, a press rod 2-6, a press rod cylinder 2-7.

Figure 9:
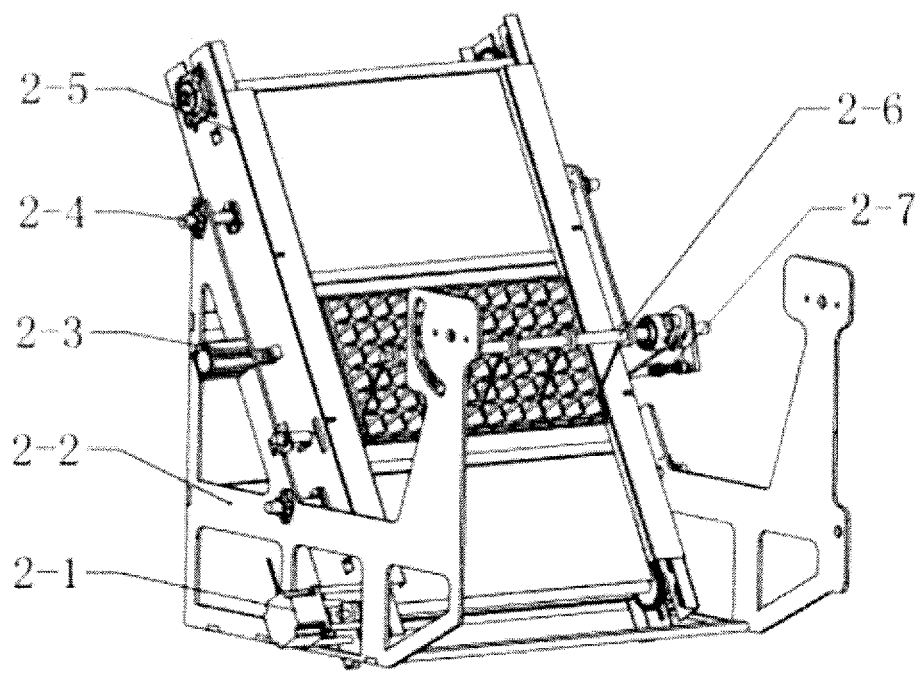
FIG. 9 is a schematic diagram of the structure of the moving box mechanism according to the present invention.

As shown in FIG. 9, the moving box frame 2-2 is equipped with left and right side plates, the second guide shaft 2-4 is transversely arranged, and the number of the second guide shaft is at least two. Each second guide shaft (2-4) passes through the hole tray conveying device 2-5, and the two ends of each second guide shaft 2-4 are fixed on the left side plate and the right side plate respectively. The hole tray conveying device 2-5 is slidingly connected with the second guide shaft 2-4. The hole tray conveying device 2-5 is equipped with a hole tray rack and a the hole tray rack driving mechanism, and the hole tray 4 is installed on the hole tray conveying rack.

The motor shaft of the stepping motor 2-1 is connected with the the hole tray rack driving mechanism and controls the longitudinal movement of the hole tray rack to the seedling picking device. The piston rod of the transverse tray moving cylinder 2-3 is connected with the hole tray conveying device 2-5 to control the transverse movement of the hole tray conveying device 2-5. The press rod 2-6 is installed on the upper side of the hole tray conveying device 2-5, and the cylinder piston rod of the press rod cylinder 2-7 is connected with the press rod 2-6. One end of the press rod cylinder 2-7 is installed on the machine frame 2-2, the other end of the cylinder piston of the press rod cylinder 2-7 is connected with the press rod 2-6, the control system is electrically connected with the press rod cylinder 2-7, the expansion and contraction of the cylinder piston rod of the press rod cylinder 2-7 are controlled, the press rod 2-6 is turned up and down, the press rod 2-6 is pressed down, waiting for the seedling to be taken out, and the press rod(2-6) rises after the seedling is taken out.

Figure 8:
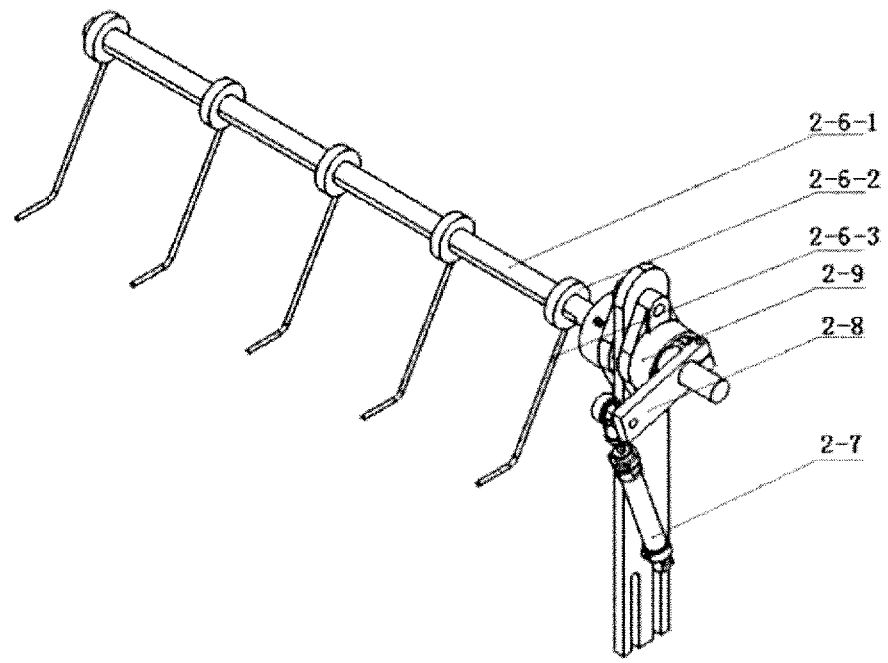
FIG. 8 is a schematic diagram of the structure of the press rod according to the present invention.

As shown in FIG. 8, the press rod 2-6 includes a press rod shaft 2-6-1, several locating ring sleeves 2-6-2 and several bent rods 2-6-3; the locating ring sleeve 2-6-2 is equidistantly mounted on the press rod shaft 2-6-1, and their relative position is adjustable. Each locating ring sleeve 2-6-2 is provided with a guide hole, and one end of the bent rod 2-6-3 is inserted with a guide hole, and is welded connected with the locating ring sleeve 2-6-2; the press rod shaft 2-6-1 is fixedly mounted at the upper end of the fixing plate of the press rod shaft via two press rod bearing pedestals.

One end of the press rod cylinder 2-7 is mounted on the fixing plate of the press rod shaft, the other end of the press rod cylinder 2-7 is connected with one end of the press rod shaft through the oscillating bar 2-8, and the lower end of the fixing plate of the press rod shaft is releasably mounted on the machine frame 2-2.

The hole tray position sensor is installed at the seedling picking position, and the hole tray position sensor is electrically connected with the control system to locate the initial entry position of the hole tray 4. The hole tray 4 moves to the initial position and triggers the seedling picking movement.

Figure 10:
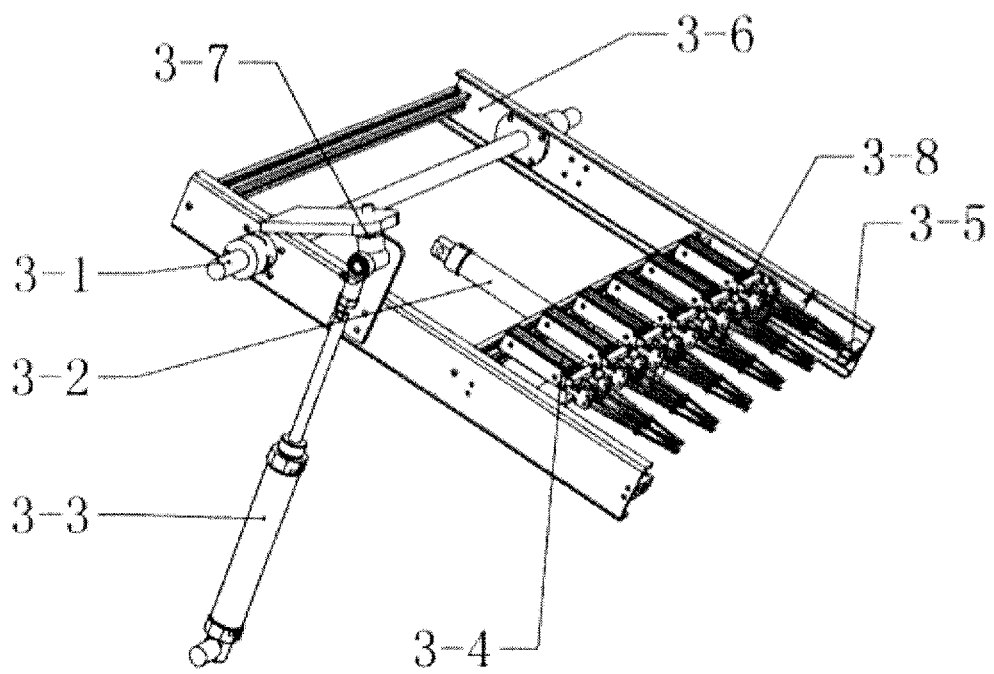
FIG. 10 is a schematic diagram of the structure of the picking seedling mechanism according to the present invention.

As shown in FIG. 10, the picking seedling mechanism 3 comprises a rotating shaft 3-1, a plug-and-pull cylinder 3-2, a turning cylinder 3-3, a plurality of seedling picking claws 3-4, a guiding optical axis 3-5, a seedling picking frame 3-6, a limit nut 3-7 and a seedling picking claw frame 3-8.

One end of the turning cylinder 3-3 is articulated with the right side plate of the moving box frame 2-2, and the piston rod of the other end of the turning cylinder 3-3 is articulated with the seedling picking frame 3-6. The rotating shaft 3-1 rotatably passes through seedling picking frame 3-6. Both ends of rotating shaft 3-1 are rotatably installed on the left and right side plates of moving box frame 2-2. The right side plates are provided with a limit block, and the limit nuts 3-7 are arranged on the limit blocks, and the seedling picking frame 3-6 stops when turned over at the position of the limit block.

The inner surfaces of both sides of the seedling picking frame 3-6 are provided with a guiding optical axis 3-5. The plurality of seedling claws 3-4 are arranged side by side on the seedling picking claw frame 3-8. The spacing between the seedling picking claws 3-4 is the same as that of the ejecting rod 1-9 on the upper ejecting rod support 1-6. The cylinder piston of the plug-and-pull cylinder 3-2 is fixedly connected with the seedling picking claw frame 3-8, and the two sides of the seedling picking claw frame 3-8 are slidingly connected with the guiding optical axis 3-5. The control system is electrically connected with plug-and-pull cylinder 3-2 and turning cylinder 3-3. By controlling the expansion and contraction of cylinder piston of plug-and-pull cylinder 3-2, the seedling picking claw frame 3-8 slides along the guiding optical axis 3-5, and the turning of the seedling picking rack 3-6 is controlled by controlling the turning cylinder 3-3.

A working method of the ejecting-clamping-pulling combined picking seedling device for an automatic transplanter includes the following steps:

S1: The hole tray 4 is mounted on the hole tray frame of the hole tray conveying device 2-5. The control system controls the stepping motor 2-1 to drive the bottom row of the hole tray 4) on the hole tray rack to the seedling picking position, and the hole tray position sensor sends the signal to the control system.

S2: The seedling picking mechanism 3 is in a vertical state. The control system receives the signal from the hole tray position sensor and controls the movement of the press rod cylinder 2-7, the press rod 2-6 is pressed down. The piston rod of the turning cylinder 3-3 extends out and drives the seedling picking frame 3-6 to rotate around the rotating shaft 3-1. When the seedling picking frame 3-6 contacts the limit nut 3-7, the seedling picking frame 3-6 stops rotating, and the seedling picking claws 3-4 are above the seedling bowl.

S3: The control system controls the piston rod 1-3 of the upper ejecting seedling cylinder of the ejecting seedling mechanism 1 to extend out, and the upper ejecting rod support 1-6 moves along the first guiding shaft 1-16. The ejecting rod 1-9 on the upper ejecting rod support loosens the seedling bowl 4 in the hole tray on the hole tray rack at interval. After the seedling bowl is ejected and loosened, the upper ejecting seedling cylinder 1-3 resets.

Figure 11:
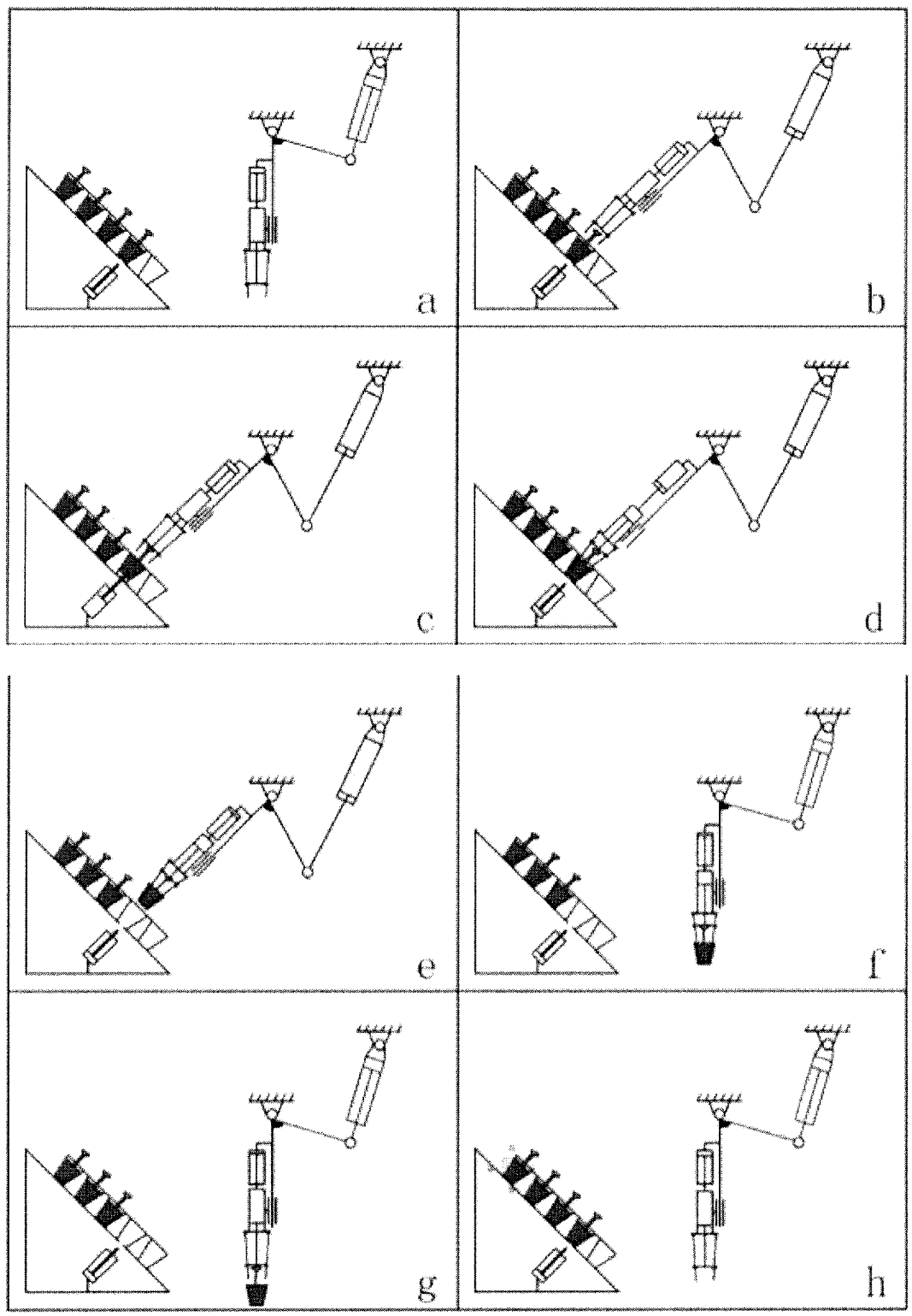
FIG. 11 is a schematic diagram of the seedling picking process of the seedling picking mechanism according to the present invention.

S4: As shown in FIG. 11, the control system controls the cylinder piston of the plug-and-pull cylinder 3-2 to extend out and drive the seedling picking claw 3-4 to insert into the seedling bowl, and the seedling picking claw 3-4 clamps the seedling bowl at the same time. Then the cylinder piston of the plug-and-pull cylinder 3-2 contracts and drives the seedling picking claws 3-4 to pull out the seedling bowl, reverses the cylinder 3-3 to reset, and turns the seedling picking frame to the vertical position. The control system controls the seedling claws 3-4 to loosen the seedling bowl and drop the seedling into the seedling cups.

S5: The transverse tray moving cylinder 2-3 drives the hole tray conveying device 2-5 to transversely move the distance between the two adjacent holes of the hole tray 4, and repeats the step of S2.

S6: The control system controls the piston rod of the lower ejecting seedling cylinder 1-11 to extend, and the lower ejecting rod support 1-10 moves along the first guide shaft 1-16. The ejecting rod 1-9 on the lower ejecting rod support 1-10 loosens the seedling hole tray 4 on the hole tray rack at interval. After the seedling bowl is ejected and loosened, the lower ejecting seedling cylinder 1-11 resets and a whole row of seedling bowls are taken out, which forms a seedling collection cycle.

S7: The controller controls the stepping motor 2-1 to drive the hole tray rack to continue to deliver a row of hole trays 4 to the seedling picking position and start the next seedling picking cycle until the whole tray seedling bowl is taken.

The embodiments are preferred embodiments of the present invention, but the present invention is not limited to the above embodiments. Without departing from the essential contents of the present invention, any obvious improvements, substitutions or variations that can be made by person skilled in the art belong to the protection scope of the present invention.

The invention claimed is:

1. An ejecting-clamping-pulling combined picking seedling device for automatic transplanter comprises an ejecting seedling mechanism, a moving-box mechanism, a picking seedling mechanism and a control system, the moving-box mechanism is mounted on a machine frame, a hole tray is mounted on the moving-box mechanism, the ejecting seedling mechanism is mounted on the moving-box mechanism and is located at a rear side of the moving-box mechanism, the picking seedling mechanism is mounted on the machine frame and located on a front side of the moving-box mechanism;

the ejecting seedling mechanism comprises an ejecting seedling frame, an upper ejecting seedling cylinder, an upper ejecting rod support, an ejecting rod, a lower ejecting seedling cylinder and a lower ejecting rod support, both of at up and down of the left and right sides of the ejecting seedling mechanism are provided with a first guide shaft, the upper ejecting seedling cylinder is fixedly mounted in a top center of the ejecting seedling frame, and the lower ejecting seedling cylinder is fixedly mounted on a bottom center of the ejecting seedling frame, the upper ejecting rod support is long rod-shaped, and one side of the upper ejecting rod support is equipped with a plurality of protrusions in equal distance along the length direction, the center distance between two protrusions is twice the distance between two adjacent holes on the hole tray, the ejecting rod passes through the protrusions and is fixed on the protrusions, the shape of the lower ejecting rod support is the same as that of the upper ejecting rod support, two ends of the upper ejecting rod support are slidingly connected with the first guide shaft at the upper end of left and right sides of the ejecting seedling frame through a first linear bearing, two ends of the lower ejecting rod support are slidingly connected with the first guide shaft at lower end of left and right sides of the ejecting seedling frame through the first linear bearing, a cylinder piston of the upper ejecting seedling cylinder is fixedly connected with the upper ejecting rod support, and a cylinder piston of the lower ejecting seedling cylinder is fixedly connected with the lower ejecting rod support;

the protrusions on the lower ejecting support and the protrusions on the upper ejecting support are staggered arranged at equal intervals, and are located on a transverse central line of the ejecting seedling frame;

the control system is electrically connected with the ejecting seedling mechanism, the moving box mechanism and the picking seedling mechanism, the control system controls the moving box mechanism to convey the hole tray to the seedling picking position, the control system controls the work of the upper ejecting seedling cylinder and the lower ejecting seedling cylinder of the ejecting seedling mechanism, respectively, and drives the upper ejecting rod support and the lower ejecting rod support to move upward respectively to make the ejecting rod passes through a hole of the hole tray, and the control system controls the picking seedling mechanism to pick seedlings from the moving box mechanism.

2. The ejecting-clamping-pulling combined picking seedling device for automatic transplanter according to claim 1, which is characterized in that the ejecting seedling mechanism also includes an upper cylinder connecting plate and a lower cylinder connecting plate, a top end of the upper cylinder connecting plate is connected with the piston rod of the upper ejecting seedling cylinder, and a bottom end of the upper cylinder connecting plate is fixedly connected with the upper ejecting rod support, a top end of the lower cylinder connecting plate is fixedly connected to the lower ejecting rod support, and a bottom end of the lower cylinder connecting plate is connected to the piston rod of the lower ejecting seedling cylinder.

3. The ejecting-clamping-pulling combined picking seedling device for the automatic transplanter according to claim 1, which is characterized in that the ejecting seedling frame comprises an upper mounting plate, a lower mounting plate, a right ejecting seedling support, a left ejecting seedling support and a guide shaft support, and two ends of the upper mounting plate and the lower mounting plate are respectively fixed on the right ejecting seedling support and the left ejecting seedling support to form a frame structure, both of the right ejecting seedling support and the left ejecting seedling support are provided with four guide shaft supports, a front and rear ends of the first guide shaft are installed on the guide shaft support.

4. The ejecting-clamping-pulling combined picking seedling device for an automatic transplanter according to claim 1, which is characterized that, the moving box mechanism comprises a stepping motor, a moving box frame, a transverse tray moving cylinder, a second guiding shaft, a hole tray conveying device, a press rod and a press rod cylinder;

the moving box frame is provided with a left side plate and a right side plate, and the second guiding shaft is arranged horizontally, and the number of the second guiding shaft is at least two, each second guiding shaft passes through the hole tray conveying device respectively, and two ends of each second guiding shaft are fixed on the left side plate and the right side plate respectively, and the hole tray conveying device are slidingly connected with the second guiding shaft, the hole tray conveying device is provided with a hole tray rack and a hole tray rack driving mechanism, a hole tray is installed on the hole tray conveying rack;

a motor shaft of the stepping motor is connected with the hole tray rack driving mechanism to control the longitudinal movement of the hole tray, a piston rod of the transverse tray moving cylinder is connected with the hole tray conveying device, and the transverse movement of the hole tray conveying device is controlled, the pressure rod is installed on an upper side of the hole tray conveying device, and the cylinder piston of the press rod cylinder is connected with the press rod, one end of the press rod cylinder is installed on the moving box frame, the cylinder piston on the other end of the press rod cylinder is connected with the press rod, the control system is electrically connected with the press rod cylinder, the expansion and contraction of the cylinder piston rod of the press rod cylinder are controlled, and the press rod is driven up and down.

5. The ejecting-clamping-pulling combined picking seedling device for an automatic transplanter according to claim 3, which is characterized in that, the press rod includes a pressure rod shaft, several locating ring sleeves and several bent rods; the locating ring sleeves are equidistantly mounted on the pressure rod shaft and their relative position is adjustable, and each locating ring sleeves is provided with a guide hole, one end of the bent bar is inserted in the guide hole and welded to a locating ring sleeve; the press rod shaft is fixedly mounted at an upper end of the press rod shaft fixing plate through two press rod bearing blocks;

one end of the press rod cylinder is mounted on the fixing plate of the press rod shaft, the other end of the press rod cylinder is connected with one end of the press rod shaft through a oscillating bar, and a lower end of the fixing plate of the press rod shaft is detachably mounted on the moving box frame.

6. The ejecting-clamping-pulling combined picking seedling device for an automatic transplanter according to claim 5, which is characterized in that, it also includes a hole tray position sensor, which is installed at a seedling picking position and electrically connected with the control system to locate the initial entry position of the hole tray, move the hole tray to the initial position and trigger the seedling picking movement.

7. The ejecting-clamping-pulling combined picking seedling device for an automatic transplanter according to claim 1, which is characterized in that, the picking seedling mechanism comprises a rotating shaft, a plug-and-pull cylinder, a turning cylinder, a plurality of seedling picking claws, a guiding optical axis, a seedling picking frame, a limit nut and a seedling picking claw frame;

one end of the turning cylinder is articulated with a right side plate of the moving box frame, a piston rod of the other end of the turning cylinder is articulated with the seedling picking frame, the rotating shaft rotatably passes the seedling picking frame laterally, and two ends of the rotating shaft are rotatably mounted on the left side plate and the right side plate of the moving box frame and the right side plate is provided with a limit block, a limiting nut is arranged on the limit block, and the seedling picking frame stops when turned over to the position of the limit block;

inner surfaces of both sides of the seedling picking frame are provided with guiding optical axis, the plurality of seedling picking claws are arranged side by side on the seedling picking claw frame, the spacing between the seedling picking claw is the same as that of the ejecting rod on the upper ejecting rod support, the cylinder piston of the plug-and-pull cylinder is fixedly connected with the seedling picking claw frame, and two sides of the seedling picking claw frame are slidingly connected with the guiding optical axis, the control system is electrically connected with the plug-and-pull cylinder and the turning cylinder, and the seedling picking claw frame slides along the guide optical axis by controlling the expansion and contraction of the cylinder piston of the plug-and-pull cylinder, and the seedling picking frame is turned by controlling the turning cylinder.

8. A working method of the ejecting-clamping-pulling combined picking seedling device for the automatic transplanter according to claim 1, which is characterized by the following steps:

S1: the hole tray is mounted on the hole tray frame of the hole tray conveying device, the control system controls the stepping motor to drive a bottom row of the hole tray on the hole tray frame to the seedling picking position, and the hole tray position sensor sends the signal to the control system;

S2: the seedling picking mechanism is in a vertical state, the control system receives the signal from the hole tray position sensor and controls the movement of the press rod cylinder the press rod is pressed down, the piston rod of the turning cylinder extends and drives the seedling picking frame to rotate around the rotating shaft, when the seedling picking frame contacts the limit nut, the seedling picking frame stops rotating, and the seedling claws are above the seedling bowl, S3: the control system controls the piston rod of the upper ejecting seedling cylinder of the ejecting seedling mechanism to extend, and the upper ejecting rod support moves along the first guiding shaft, the ejecting seedling rod on the upper ejecting rod support ejects and loosens the seedling bowl in the hole tray on the hole tray rack at interval, after the seedling bowl is ejected loosened, the ejecting seedling cylinder resets;

S4: the control system controls the cylinder piston of the plug-and-pull cylinder to extend and drive the seedling picking claw to insert into the seedling bowl, and the seedling picking claw clamps the seedling bowl at the same time, then the cylinder piston of the plug-and-pull cylinder contracts and drives the seedling picking claws to pull out the seedling bowl, reverses the cylinder to reset, and turns the seedling picking frame to the vertical position, the control system controls the seedling claws to loosen the seedling bowl and drop the seedling into the seedling cups;

S5: the transverse tray moving cylinder drives the hole tray conveying device to laterally move the distance between the two adjacent holes of the hole tray, and repeats the step of S2, S6: the control system controls the piston rod of the lower ejecting seedling cylinder to extend, and the lower ejecting support moves along the first shaft, the ejecting rod on the lower ejecting rod support ejects and loosens seedling bowl in the hole tray on the hole tray rack at interval, after the seedling bowl is ejected and loosened, the lower ejecting seedling cylinder resets and a whole row of seedling bowls are taken out, which forms a seedling collection cycle; and S7: the controller controls the stepping motor to drive the hole tray rack to continue to deliver a row of hole trays to the seedling picking position and start the next seedling picking cycle until the whole tray seedling bowl is taken.

\* \* \* \* \*